United States Patent [19]

Aubry

[11] 4,386,989
[45] Jun. 7, 1983

[54] METHOD FOR PRODUCING A BENDABLE AND TWISTABLE ELEMENT AND SUCH AN ELEMENT PRODUCED THEREBY

[75] Inventor: Jacques A. Aubry, Cabries, France

[73] Assignee: Societe Nationale Industrielle et Aerospatiale, France

[21] Appl. No.: 227,879

[22] Filed: Jan. 23, 1981

[30] Foreign Application Priority Data

Jan. 28, 1980 [FR] France .................... 80 01745

[51] Int. Cl.³ .................... B32B 31/00; B29C 19/00; F01D 25/26; B29F 1/00
[52] U.S. Cl. .................... 156/182; 156/228; 156/245; 156/296; 156/305; 156/307.7; 156/221; 416/135; 416/230; 416/241 A; 264/261; 264/328.1
[58] Field of Search .............. 156/181, 182, 242, 245, 156/264, 285, 296, 305, 306.6, 306.9, 307.7, 308.6, 309.9, 327, 322, 221, 222, 228, 244.11, 244.18; 264/279, 261, 260, 328.1; 416/226, 230, 241 A, DIG. 6, 134 A, 134 R, 135 B, 135 A, 136; 74/581; 428/290, 293, 294, 295, 169

[56] References Cited

U.S. PATENT DOCUMENTS 3,599,291 8/1971 Alexander .................... 264/277
3,619,448 11/1971 Palfreyman et al. .......... 264/261
3,762,834 10/1973 Bourquardez et al. ....... 416/135 B
4,251,309 2/1981 Class et al. .................. 156/242

FOREIGN PATENT DOCUMENTS 2041747 2/1971 France .
2065532 7/1971 France .
51-43066 6/1972 Japan ...................... 264/261
1125513 8/1968 United Kingdom .

Primary Examiner—Edward C. Kimlin
Assistant Examiner—Louis Falasco
Attorney, Agent, or Firm—Karl W. Flocks; A. Fred Starobin

[57] ABSTRACT

A bendable and twistable element having a high level of tensile strength, while remaining flexible and bendable in respect of twisting is produced by individually forming in a mould unitary layers of resin impregnated cut lengths of a continuous member, with their ends located between resin impregnated layers of fabric, polymerizing the resin, locating a plurality of the unitary layers in a further mould with the interposition, between the superposed pairs of layers of fabric, of layers of glue, setting the glue by heating and compression to form rigid end members, injecting a viscous elastomer into the middle portion of the bundle of cut lengths of the several unitary layers and curing the elastomer. The elements have particular use for connecting helicopter rotor blades to a hub member.

6 Claims, 9 Drawing Figures

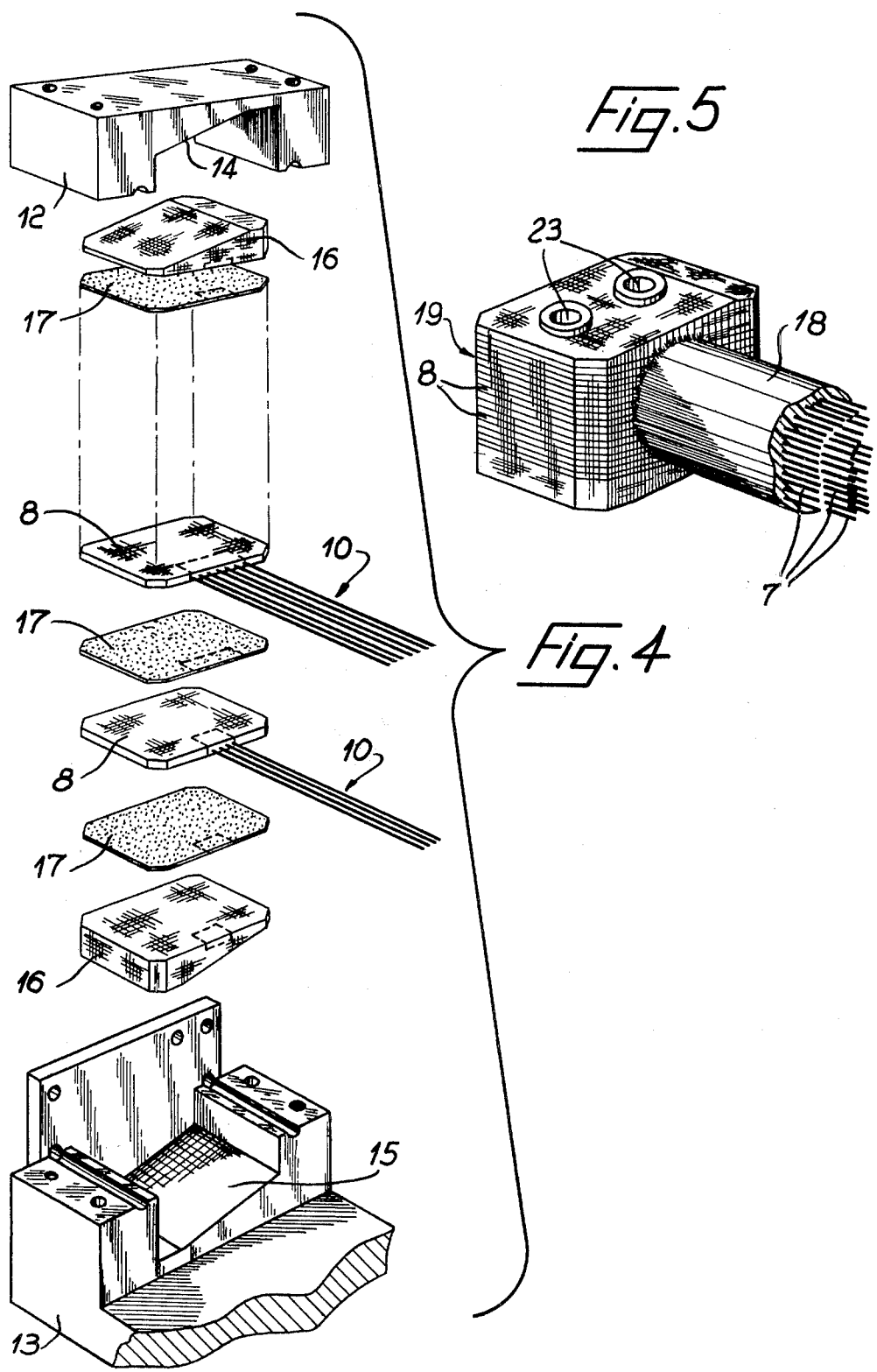

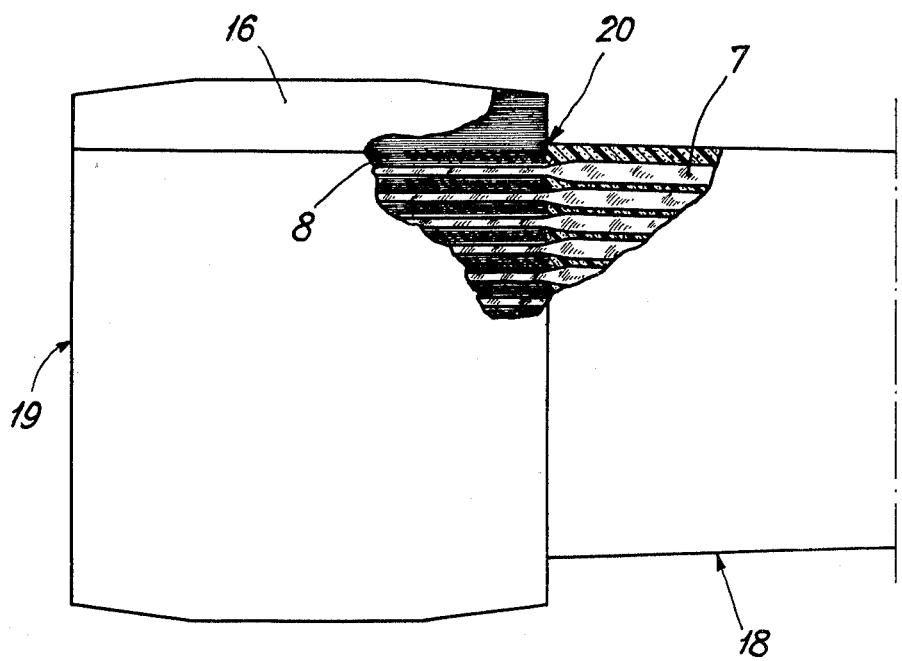

METHOD FOR PRODUCING A BENDABLE AND TWISTABLE ELEMENT AND SUCH AN ELEMENT PRODUCED THEREBY

TECHNICAL FIELD

This invention relates to a method of producing a bendable and twistable element and to such an element produced by the method.

The element which is intended more particularly but not exclusively for connecting two members, should have a high level of tensile strength while remaining flexible in respect of twisting about the longitudinal axis of the element and of bending perpendicularly to said axis. By way of example, such elements can be used in aeronautical engineering, in particular in the construction of helicopters.

PRIOR ART

Ternary composite elements are already known, comprising filaments with a high level of mechanical strength, a thermosetting resin and an elastomer. The filaments are embedded in the thermosetting resin and combined together to form a member of any one of various shapes. The shaped members are juxtaposed to form a bundle or strand and, in their middle portion, are individually embedded in and agglomerated by the cured elastomer while they spread out at the ends of the bundle where they are interposed between layers of fabric of synthetic fibers. Such an element is described in French patent No. 69.16 289 filed on May 20, 1969 by the present assignee, for connecting the blades to the hub of a helicopter rotor.

The previously proposed method of producing such a bendable and twistable connecting element comprised:

passing continuous filaments through an impregnation machine containing a thermosetting resin and then through a die to produce an impregnated continuous member of the desired shape;

cutting desired lengths of the continuous shaped member;

manually disposing the following in a lower mould half having the shape of the lower half of the element desired:

rovings disposed transversally to the longitudinal axis of the connecting element, layers of covering fabric in the regions of the element at which it is to be attached, particularly at the two ends thereof, at least a layer of resin impregnated fiber fabric at the ends of said mould half and, in the central region, a first elastomer layer and, on this layer, a layer of said lengths impregnated by unpolymerised resin, said lengths being disposed longitudinally and being slightly spaced from each other, flattening the ends of the cut lengths against the layers of fabric;

pouring a second elastomer layer, adding on the assembly a second layer of said lengths, the ends of which are flattened onto the preceding layers;

repeating the deposits of fabric layers, lengths and elastomer layer in accordance with the foregoing cycle until the lower mould half is completely filled;

filling an upper mould half in the same manner to that in which the lower mould half was filled;

assembling the two filled mould halves together;

efecting polymerisation for a time and under temperature conditions required by the resin and the elastomer used; and finally removing the assembly from the mould.

It will be seen from the actual list of steps to be performed that the major disadvantage of the prior art lies in the long period required for preforming the production operation and consequently in the high cost of a manufactured element, which cost is acceptable for producing prototype elements and elements for research and experimentation, but is incompatible with mass production. Moreover, in spite of the precautions taken, such a process results in the lengths being irregularly distributed in the middle of the element, while also resulting in the lengths being curved to a greater or lesser degree, these being factors which are highly disadvantageous in regard to proper transmission of the forces involved and for the overall strength of the bendable and twistable element when subjected to dynamic forces.

One object of the invention is a method for producing flexible and twistable composite elements which is suitable for industrial use and which has not the drawbacks set out above.

SUMMARY OF THE INVENTION

According to the invention, there is provided a method for producing a bendable and twistable composite element comprising filaments having a high level of mechanical strength, a thermosetting resin and a curable elastomer, comprising the steps of:

passing said filaments through an impregnating machine containing said thermosetting resin;

joining together impregnated filaments thereby obtained and calibrating them by passing through a die to produce a continuous member of the desired shape;

cutting lengths of the shaped member;

forming a plurality of unitary layers, each unitary layer being formed by:

locating said cut lengths, each impregnated with said resin which is still in the unpolymerised state, in calibrated grooves provided in a first mould with end portions of said cut lengths being flattened between resin-impregnated layers of fabric; and polymerising said resin on said impregnated cut lengths and in said layers of fabric;

assembling a plurality of said unitary layers in a second mould to form a bundle in which said cut lengths of said plurality of unitary layers are suitably spaced;

injecting elastomer in a viscous state into said bundle, the kind and the viscosity of the particular elastomer used being selected according to the characteristics of resiliency and damping which are to be provided by the elastomer; and curing the elastomer at a temperature and for a time appropriate to the characteristics thereof.

According to the invention, the quality of the bendable and twistable elements produced can be very markedly improved, by virtue of the perfect straightness of the shaped members and the regular distribution thereof in the middle portion of the element. The operations which are performed in the course of the method can be perfectly repeated, thus permitting industrial manufacture. The sequence of the production steps permits a complete automation of the method, resulting in a reduction in the number of working hours, by a factor of ten approximately, thereby considerably reducing the cost of each element. Finally, the same sequence of steps also allows easier and more complete checking of each element, which is essential in the aeronautical industry.

BRIEF DESCRIPTION OF DRAWINGS

Other objects and advantages of the invention will be apparent from the following description of a particular embodiment which is given by way of non-limiting example, with reference to the accompanying drawings, in which drawings:

FIG. 4 is a view of part of a further mould for assembling such unitary layers;

FIG. 5 shows one end portion of a bendable and twistable element according to the invention;

FIG. 9 is a view in partial section of an alternative form of an assembly of layers.

DETAILED DESCRIPTION

Figure 1:
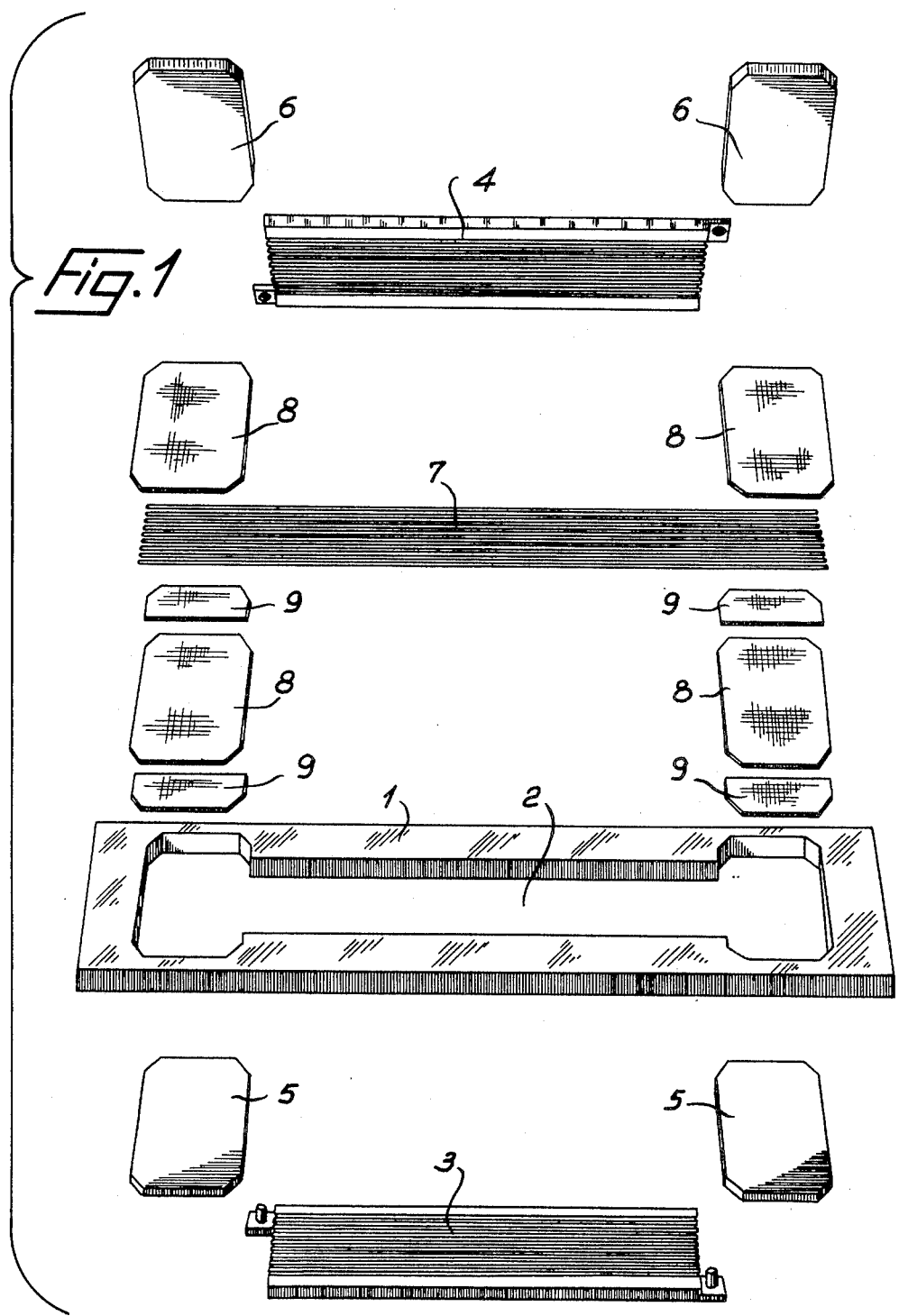
FIG. 1 is an exploded view of a mould and components to be disposed within the mould, to produce a unitary layer.
Figure 2:
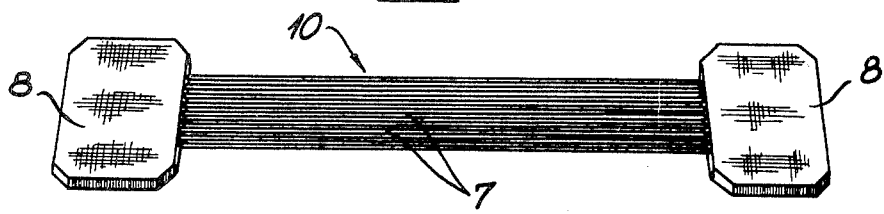
FIG. 2 shows a unitary layer which is produced by moulding in the mould shown in FIG. 1.

Referring to the drawings and firstly to FIG. 1, a mould for the production of a unitary layer has a body 1 with an opening 2 in its middle part. The opening 2 permits the introduction of two grooved plates 3 and 4 and two sets of end closure plates 5 and 6 respectively. FIG. 1 also shows components of the unitary layer of fibrous material, above the body 1, before assembly. In the embodiment illustrated, the components comprise a pluralilty of lengths, illustrated as rods 7, layers 8 of fabric and side end packing members 9. To produce a unitary layer, the rods 7 which are impregnated with a thermosetting resin which has not yet been polymerized are disposed in the grooves in the plates 3. The ends of the rods 7 project in the mould beyond the ends of the grooved plate 3 and rest at each end on at least one layer of fabric 8 of resin-impregnated fibers. The side end packing members 9 are provided at positions laterally of the ends of the rods 7 and, with the ends of the rods 7, are flattened or pressed with at least one second layer 8 of fabric, thereby to form a sandwich providing a connecting attachment of laminated type. The assembly comprising the rods 7, layers of fabric 8 and packing members 9 is pressed in the mould 1 and polymerised by heating. This results in a unitary layer 10 such as is shown in FIG. 2, in which forces are transmitted from the rods 7 to the fabric layers 8 by shearing in the resin. In the example shown in FIGS. 1 and 2, the lengths are shaped rods which can be extruded from a die with various sections, for example circular or polygonal, but it will be apparent that it is also possible to use members of any section, in strip form of various sections, being rectangular or elliptical with a greater or lesser degree of flattening, for example. The only modification required relates to the shape of the grooves in the plates 3, 4.

Figure 3:
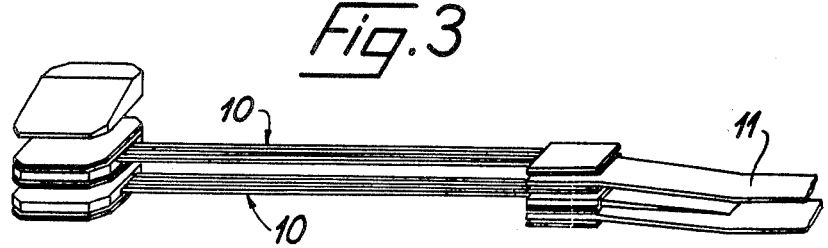
FIG. 3 is an exploded view of an assembly of two unitary layers.

For producing flexible and twistable element, a plurality of the unitary layers 120 are assembled together and FIG. 3 shows a highly diagrammatic view of such an assembly. In FIG. 3 it can be seen that two unitary layers 20 are joined so that their left-hand ends form a block or unit in which bores may be drilled to form a mounting member or plate while the right-hand ends of the layers are intended to form a splint-type connection. Such an element can be flexible and twistable and can form the mechanical connection between the strong structure of a blade 11 and a helicopter rotor hub (not shown), and can permit the angle of incidence of the blade to be controlled, while permitting flapping and lagging or trailing movements thereof.

FIG. 4 shows a view of part of the end of a further mould for assembling a plurality of unitary layers. While FIG. 3 showed a diagrammatic view of only two unitary layers 10, in practice, a stack thereof may comprise between ten and twenty unitary layers which are joined together by films of adhesive. FIG. 4 shows only two layers, for the purposes of simplification, and the upper and lower ends 12 and 13 respectively of the further mould.

As can be seen from FIG. 4, base surfaces 14 and 15 of the further mould are inclined, and shoe members 16 which taper in thickness transversely are provided to act as pre-packing members for presetting the condition of incidence required when the element is to be used for the above-mentioned purpose. The further mould shown in FIG. 4 makes it possible for the unitary layers to be assembled in a very precise manner and for them to be secured together by glueing under pressure, a film of adhesive glue 17 being introduced between each adjacent pair of the layers, the adhesive being hardened by subsequently heating the further mould.

After removal from the further mould, the element is finished to the form shown in FIG. 5 by embedding the middle part of the rods 7 to produce an elongated cylindrical portion 18, and positioning of sleeves 23 in bores of the end portion 19, the sleeves 23 being retained by example by glueing. Said sleeves are for housing spindles for securing the end portions to suitable members. The embedding step for forming the portion 18 is performed by casting or injecting an elastomer in a liquid or viscous state, into the bundle of rods 7. The portion 18 of the element is bendable and twistable relative to the end portions 19 which are rigid.

Figure 7:
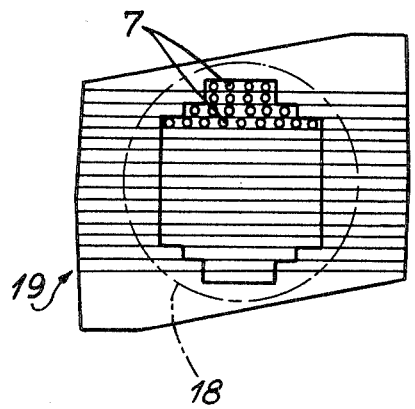
FIG. 7 is a view in section taken on line VII—VII in FIG. 6.
Figure 8:
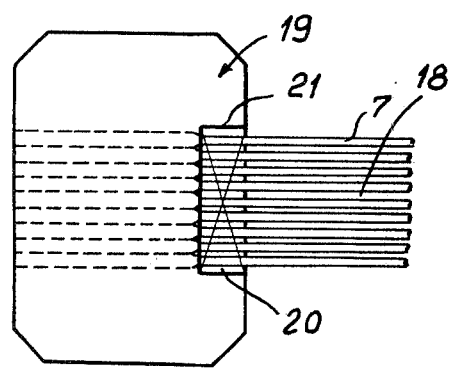
FIG. 8 is a view in partial section of an assembly of layers.

Preferably, and as can be seen from FIGS. 7 and 8, provided between the middle bendable and twistable portion 18 of the element and the rigid mounting end portion 19 is a short transitional region 20 which is intended to reduce overstressing of the rods 7 at the position of embedding engagement.

For this purpose, a depression is formed in the transitional region 20 and is filled by injection with an elastomer 21 which is less flexible than the elastomer of the matrix forming the middle portion 18 of the bendable and twistable element. The elastomer 21 embedding the rods in the region 20 reduces the rigidity of the embedding thereof in the fixing regions and therefore the stress level when the connecting arm is subjected to bending and/or twisting forces. The depression in the region 20 is formed by example by making a cut-out portion in each of the members forming the element (unitary layers, layers of fabric, films of adhesive, shoe members, . . . ). The depression can also be formed by cutting out a portion from the fabric layers 8 before the unitary layers 10 are produced, as indicated in FIG. 9. In order to avoid introducing glue during the assembly operation, the chamber can be filled with a soluble substance which is washed out after polymerisation.

Figure 6:
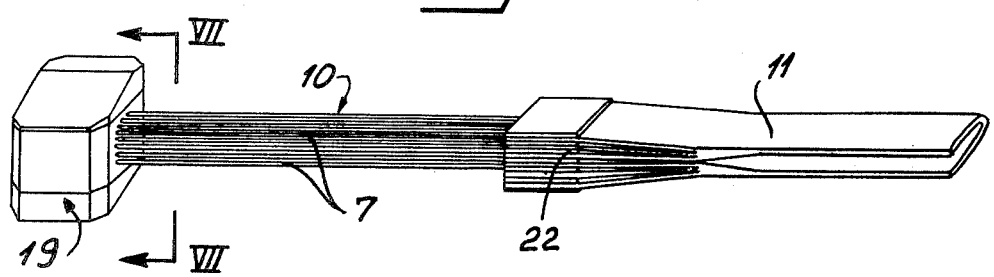
FIG. 6 is a diagrammatic view showing an embodiment of the invention.

FIG. 6 shows a particular embodiment of bendable and twistable element made by the method according to the invention wherein the element forms a connecting arm between a blade 11 and a helicopter rotor hub, wherein the end portion 19 of the element is shaped as a block which can be prepared to form a mounting member for attachment to the hub, while the other end forms a splint-type connection for a longitudinal member of a blade. Longitudinal rovings 22 projecting from the longitudinal blade member 11 are interposed directly between the rods 7 of each adjacent pair of the unitary layers 10. At the location of the splint-type connection, the rods 7 are flattened or pressed as described hereinbefore. Elastomer is then injected into the middle part of the element and cured.

It will be apparent that modifications may be made in the above-described embodiment, in particular by substitution of technical equivalents, without thereby departing from the scope of the present invention.

I claim:

1. A method for producing a bendable and twistable composite element for mechanically connecting two members, said bendable and twistable element having an elongate ternary composite middle portion, comprising filaments having a high level of mechanical strength, a thermosetting resin and a curable elastomer, the method comprising the steps of passing said filaments through an impregnating machine containing said thermosetting resin;

joining together impregnated filaments thereby obtained and calibrating them by passing through a die to produce an impregnated continuous member of a desired shape;

and cutting lengths of the shaped member; wherein the method further comprises the steps of forming a plurality of unitary layers, each unitary layer being formed by locating the middle portion of said cut lengths of said shaped member, each impregnated with said resin which is still in the unpolymerised state, in straight, parallel and calibrated grooves, having a section corresponding to that of said shaped member and provided in a first mould, with the two end portions of said cut lengths projecting in said first mould beyond the ends of said grooves and resting each on at least one layer of fabric of resin impregnated fibers, disposing onto each of said two end portions of said cut lengths at least another layer of said fabric, pressing and flattening said two end portions of said cut lengths between said resin-impregnated layers of fabric, and polymerising said resin on said impregnated cut lengths and in said layers of fabric;

stacking a plurality of said unitary layers in a second mould to form a bundle with said middle portions of said cut lengths, and in which bundle said cut lengths of said plurality of unitary layers are suitably spaced disposing layers of adhesive between said layers of fabric of said stacked unitary layers, at least at one end portion of said bendable and twistable element, applying heat and compression to the stack thus obtained in said second mould to form at least one rigid connecting attachment end portion of the laminated type, to be secured to at least one of the two members to be connected;

injecting elastomer in a viscous state into said bundle of said middle portions of said cut lengths, the kind and the viscosity of the particular elastomer used being selected according to the characteristics of resiliency and damping which are to be provided by the elastomer, curing the elastomer at a temperature and for a time appropriate to the characteristics thereof, to form said elongate ternary composite middle portion of said element and forming a depression at least at one end portion of said element at the location at which said cut lengths of said unitary layers enter between said impregnated layers of fabric and filling said depression by injecting an elastomer which is less flexible than said elastomer injected into said bundle of said middle portions of said cut lengths thereby reducing the rigidity of embedding of said cut lengths.

2. The method claimed in claim 1, further comprising, at least at one end portion of said bendable and twistable element, interleaving the corresponding end of each of said plurality of said unitary layers with longitudinal rovings projecting from one of the said two members to be connected to the element thereby to form a splint-type connecting attachment.

3. The method claimed in claim 1, further comprising forming bores in said at least one rigid connecting attachment end portion and fitting sleeves into said bores to serve as housings for spindles for securing said at least one end portion to said at least one member to be connected.

4. The method claimed in claim 1, wherein said shaped member is calibrated so that said cut lengths are in the form of rods.

5. The method claimed in claim 1, wherein said shaped member is calibrated so that said cut lengths are in the form of strips.

6. A method for producing a bendable and twistable composite element for mechanically connecting two members such as a rotor blade and its hub comprising the steps of impregnating filaments with a thermosetting resin which is still in the unpolymerised stated, locating cut lengths of said impregnated filaments in a first mold with their middle portions in straight, parallel and calibrated grooves and with the two end portions of said cut lengths projecting in said first mold out of opposite sides beyond the ends of said grooves and resting on each end on at least one layer of fabric of resin-impregnated fibers, disposing onto each of said two end portions of said cut lengths at least another layer of said fabric, pressing and flattening said two end portions of said cut lengths between said resin-impregnated layers of fabric, poymerising said resin on said impregnated cut lengths and in said layers of fabric forming a unitary layer, stacking a plurality of said unitary layers in a second mold to form a bundle of said middle portions of said cut lengths in which bundle said cut lengths of said plurality of said unitary layers are in spaced relationship to each other, disposing layers of adhesive between said layers of fabric of said stacked unitary layers at least at one end portion of said cut lengths, applying heat and compression to the stack in said second mold to form at least one rigid connecting attachment end portion of the laminated type to be secured to at least one of the two members to be connected, injecting elastomer in a viscous state into said bundle of said middle portions of said cut lengths, selecting said elastomer according to its characteristics of resiliency and damping, curing said elastomer at a temperature and for a time appropriate to its selected characteristics to form a middle portion of said bendable and twistable composite element, forming a depression in conjunction with a prior step at a location at which said cut lengths of said unitary layers enter between said impregnated layers of fabric, and filling said depression by injecting therein an elastomer which is less flexible than said elastomer injected into said bundle of said middle portions of said cut lengths.

* * * * *